March 3, 1964  J. A. LOOMER ETAL  3,123,453
METHOD AND APPARATUS FOR PROCESSING A NATURAL GAS STREAM
Filed May 16, 1960  2 Sheets-Sheet 1

JAMES A. LOOMER,
JOHN W. WELCH,
EDWIN M. ARENSON
WILLIAM L. SCHEIRMAN
INVENTORS

BY
ATTORNEY

United States Patent Office 3,123,453
Patented Mar. 3, 1964

3,123,453
METHOD AND APPARATUS FOR PROCESSING A NATURAL GAS STREAM
James A. Loomer, John W. Welch, Edwin M. Arenson, and William L. Scheirman, all of Oklahoma City, Okla., assignors to Black, Sivalls & Bryson, Inc., Kansas City, Mo., a corporation of Delaware
Filed May 16, 1960, Ser. No. 29,202
6 Claims. (Cl. 55—33)

The present invention relates generally to a system of removing certain components from a gas stream. More specifically, the present invention relates to a system and an apparatus for removing certain components from a natural gas stream by adsorption.

Natural gas streams produced from natural gas wells are most often saturated with water vapor. Also such streams contain recoverable heavier hydrocarbons such as propane, butane, pentane, hexane and heptane and small amounts of heavier hydrocarbons. In the gathering, transmission and distribution of natural gas it is possible and probable that a large portion of such components of the original natural gas stream production will condense in the lines as liquid causing reduced transmission efficiency and sometimes complete stoppage of the flow of natural gas through these lines. This condensation problem is particularly troublesome in winter weather since reduced temperatures will cause additional condensation and may cause some of the condensates to freeze or form gas hydrates.

The removal of the water vapor from the natural gas stream is therefore required by most contracts relating to the purchase of natural gas to be transported in a pipeline. A minimum amount of condensable hydrocarbons also may be specified in such contracts. The removal and subsequent recovery of the condensable hydrocarbons has the added advantage that the recovered condensed hydrocarbons can be sold and with many natural gas streams such recoveries will not only pay for the equipment needed for the removal and recovery of such liquids but will also give the operator a profit from the sale of the recovered hydrocarbons.

In the past both dehydration of and hydrocarbon recovery from natural gas streams have been accomplished by the use of adsorbent materials or solid desiccants such as activated alumina and silica gel. The use of these materials has resulted in one particular type of process wherein one bed of adsorbent material is used for adsorbing the components from a natural gas stream while a second similar bed is being regenerated. The regeneration of saturated or partially saturated beds of this material is accomplished by flowing heated gas through the bed. The heated gas will vaporize the adsorbed components and will carry these components from the bed. Generally, this regeneration stream leaving the bed is cooled to condense the vaporized components and the condensates are removed from the regeneration stream. This regeneration stream is then either heated and recycled through the bed being regenerated or is returned to the main gas stream depending on whether the system being used is a closed or an open system respectively.

Since heat is used to vaporize the components adsorbed by the adsorbent bed, it is necessary to cool a regenerated adsorbent bed so that it will regain its capacity for adsorption prior to being connected to the main gas stream. We have found that in such heating and cooling of the adsorbent beds that a substantial portion of the heating and cooling requirements is required by the necessity of heating and cooling the structure supporting and vessel containing the adsorbent bed. The heating and cooling of an adsorbent bed during regeneration accounts for a substantial portion of the operating expense of such adsorption equipment.

Therefore, it is the primary object of the present invention to provide a system and an apparatus for adsorbing components from a natural gas stream having reduced heating and cooling requirements.

Another object of the present invention is to provide an adsorption system with an adsorption vessel providing insulation against heat losses during regeneration.

A further object of the present invention is to provide an adsorption vessel having improved design insulating the adsorbent bed from the vessel walls to reduce the regeneration heating and cooling of the adsorbent bed.

A still further object of the present invention is to provide an adsorption vessel having an improved flow path for cooling of the adsorbent bed contained therein also providing insulation between the adsorbent bed and the walls of the adsorption vessel.

In accomplishing these and other objects of the present invention, we have provided improved details of structure, the preferred form of which is illustrated in the accompanying drawings wherein.

Figure 1:
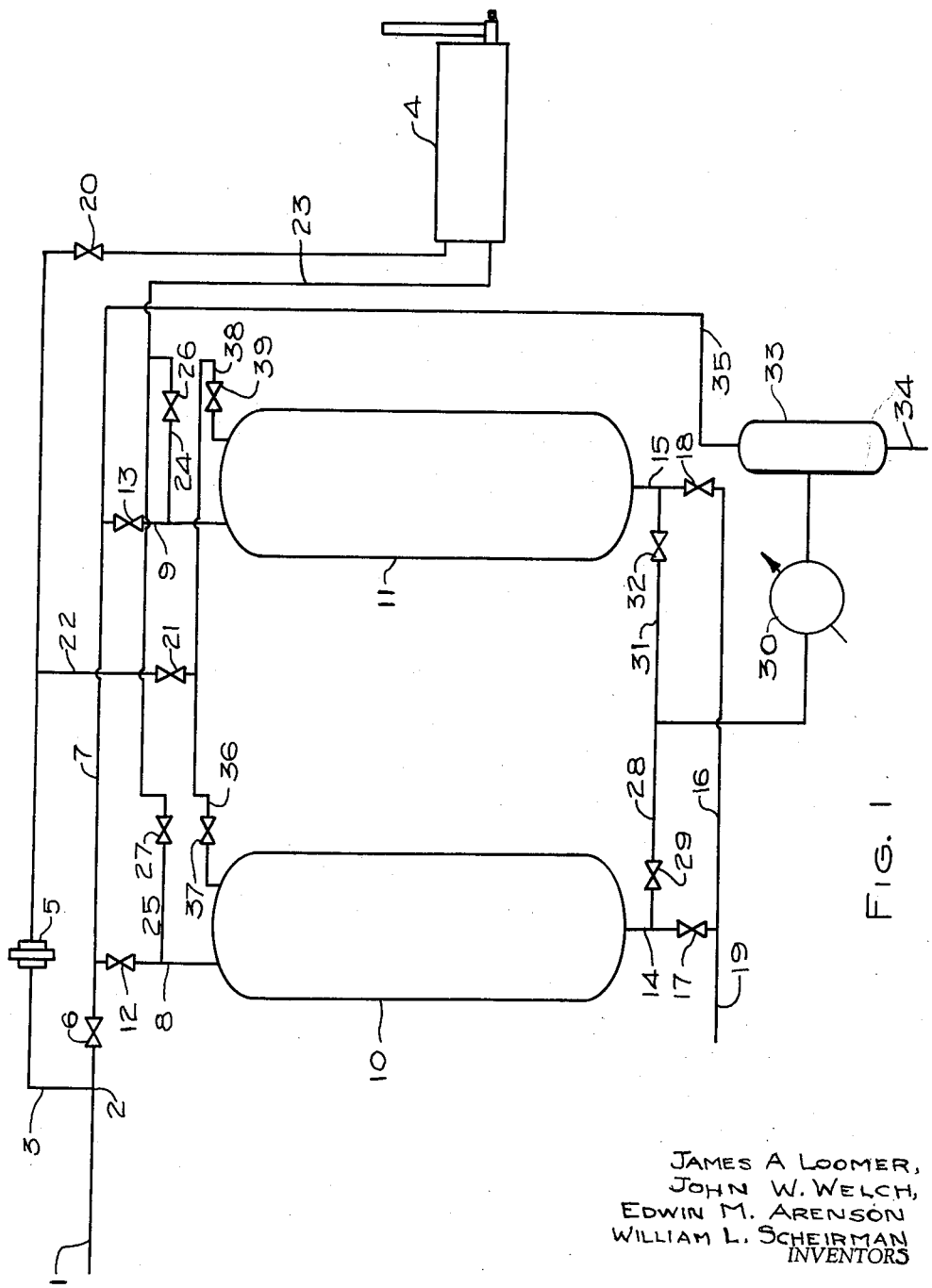
FIG. 1 is a schematic diagram of an adsorption system utilizing the novel features of the present invention.

Referring more in detail to the drawings:

The adsorption system of FIG. 1 is an open type system, that is, the regeneration gas stream is withdrawn from the main gas stream and after completing a cycle of the regeneration system is then returned to the main gas stream. A deliberate pressure drop in the main gas stream between the point of withdrawal and the point of return of regeneration gas is used to provide the pressure necessary to cause sufficient gas to flow through the regeneration gas system. The main gas stream flows into the system illustrated in FIG. 1 through line 1. Regeneration gas is withdrawn from line 1 at 2 and conducted through line 3 and flow controller 5 to heater 4. The main gas stream flows through line 1 and valve 6 into header 7. Flow controller 5 is connected to control valve 6 so that sufficient gas will flow through the regeneration system. Lines 8 and 9 extend from header 7 to adsorption vessels 10 and 11 respectively. Valves 12 and 13 are positioned in lines 8 and 9 respectively to cause the main gas stream to flow to either adsorption vessel 10 or adsorption vessel 11. Lines 14 and 15 extend from vessels 10 and 11 respectively as shown to header 16. Line 14 is controlled by valve 17 and line 15 is controlled by valve 18. Header 16 is connected to line 19 through which the main gas stream is conducted from the system shown in FIG. 1 to suitable storage or transmission lines (not shown).

Valve 20 controls the flow of regeneration gas to heater 4 and valve 21 controls the flow of regeneration gas to header 22. When valve 20 is open, valve 21 will be closed to direct the regeneration gas stream to heater 4. When an adsorbent bed has been sufficiently regenerated by the hot regeneration gas, valve 20 will be closed and valve 21 will be opened directing the regeneration gas stream to header 22.

The hot regeneration gas from heater 4 flows through line 23 into line 24 or line 25 depending on which vessel is being regenerated. Valve 26 is positioned in line 24 to allow regeneration gas to flow through line 24 to adsorption vessel 11 and valve 27 is positioned in line 25 to allow regeneration gas to flow through line 25 to adsorption vessel 10. Regeneration gas flowing from vessel 10 flows through line 14, line 28 through valve 29 to cooler 30. Regeneration gas from vessel 11 flows through line 15, line 31 and valve 32 into cooler 30. Cooler 30 is connected to separator 33. Line 34 conducts liquids discharged from separator 33 to some suitable place of storage (not shown) and line 35 conducts gas from separator 33 back into header 7 at a point downstream of valve 6.

Cooling gas flows from main gas line 1 through regeneration gas line 3, valve 21 into header 22. Line 36 connects through valve 37 to adsorption vessel 10. Line 38 connects from header 22 through valve 39 into adsorption vessel 11. The cooling gas leaving vessel 10 flows through line 14, line 28, valve 29, cooler 30, separator 33 and line 35 into the main gas stream header 7. Similarly, cooling gas from vessel 11 is conducted through line 15, line 31, valve 32, cooler 30, separator 33, line 35 into main gas stream header 7.

Figure 2:
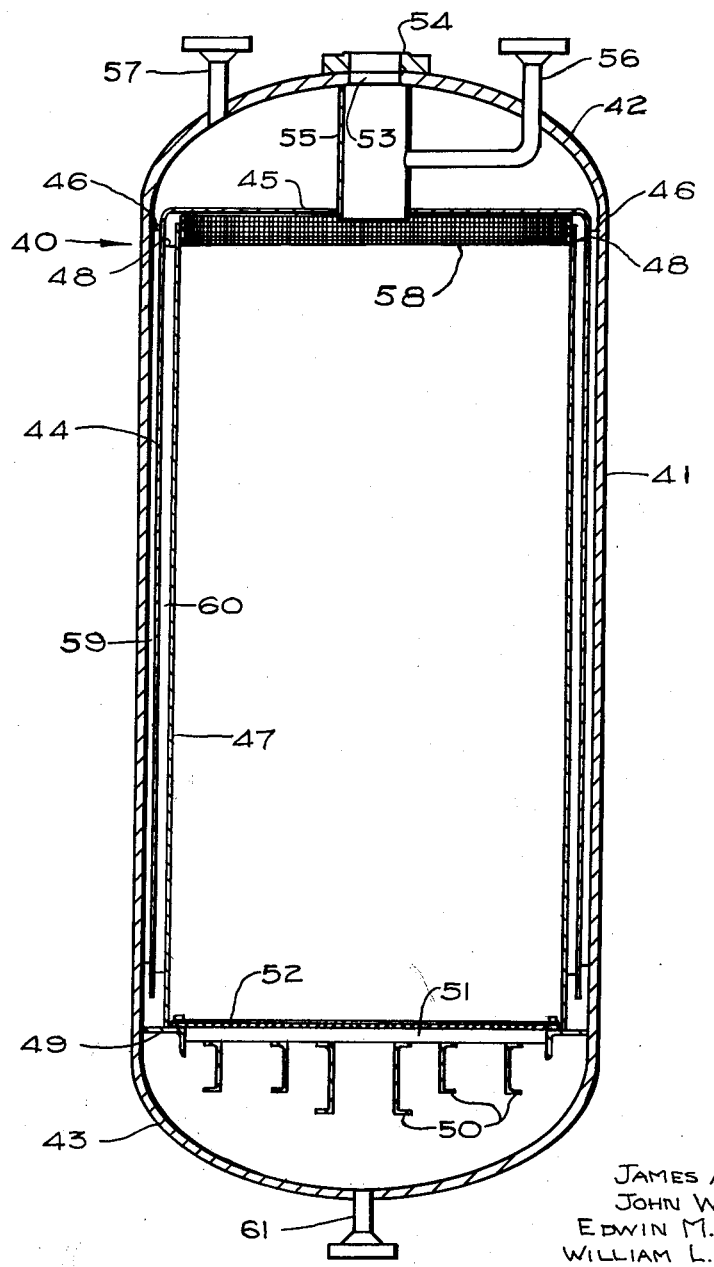
FIG. 2 is a detail sectional view of an adsorption vessel embodying novel features of the present invention.

Sorber 40 as shown in FIG. 2 is typical construction for the adsorption vessels 10 and 11 shown in FIG. 1. Sorber 40 is composed of outer upright cylindrical shell 41, an upper head 42 and a lower head 43. Positioned within shell 41 and extending substantially the entire length thereof is an intermediate shell 44 which is closed at its upper end by head 45. Spacers 46 which are secured to shell 41 position intermediate shell 44 within shell 41. Inner shell 47 is positioned within and spaced from intermediate shell 44 by spacers 48. The lower end of inner shell 47 is secured to angle ring 49 which is secured to the inner surface of shell 41. It should be noted that the lower edge of intermediate shell 44 terminates at a position substantially above angle ring 49. Channel members 50 extend across shell 41 and support grid 51 which in turn supports screen 52. Screen 52 is also secured to angle members 49 and generally provides support for the adsorbent to be contained within inner shell 47. Adsorbent fill opening 53 extends through upper head 42 and is surrounded on the exterior of head 42 by flange member 54 which is suitably adapted for receiving a blind flange closure. Duct 55 is fixedly secured to the inner surface of head 42 surrounding opening 53 and extends downwardly within sorber 40 through head 45. The main gas inlet 56 extends through head 42 for connection into duct 55. Regeneration cooling gas inlet 57 extends through head 42 and connects with the interior of vessel 40 between head 45 and upper head 42. Cylindrical screen member 58 is secured to the upper inner surface of inner shell 47. Space 59 between shell 41 and intermediate shell 44 and space 60 between intermediate shell 44 and inner shell 47 should be sufficiently large so as not to cause excessive pressure drop when the regeneration cooling stream is conducted therethrough. Outlet duct 61 extends from the lower central portion of lower head 43. Adsorbent material substantially fills the interior of inner shell 47 but for purposes of clarity is not shown in FIG. 2.

In operation the main gas stream could, for example, initially flow through adsorption vessel 10. Referring to FIG. 2, this flow through vessel 10 may be illustrated with reference to sorber 40. Main gas stream flows into sorber 40 through main gas inlet 56 and duct 55 directly into and through the adsorbent bed within inner shell 47 and is discharged from sorber 40 through outlet duct 61 as shown in FIG. 2 which is similar to line 14 as shown in FIG. 1. At the same time adsorption vessel 11 is being regenerated. Regeneration gas is conducted from the main gas stream through line 3, flow controller 5, heater 4, line 23, line 24 and valve 26 into vessel 11.

Viewing sorber 40 in FIG. 2 as a detail of vessel 11, the hot regeneration gas enters sorber 40 through inlet duct 56 and duct 55 directly into the adsorbent bed within inner shell 47. The regeneration gas stream flows from sorber 40 through outlet 61 which is line 15 in FIG. 1. During regeneration valve 18 remains closed and valve 32 open so that the regeneration gas stream leaving vessel 11 flows through valve 32, line 31 and cooler 30 into separator 33. The cooling of the regeneration gas stream in cooler 30 should be sufficient to condense a substantial portion of the desired condensable components of the regeneration gas stream for removal in separator 33. The gas stream is then conducted through line 35 into header 7.

When the regeneration of the adsorbent has been completed as determined by a sensing device or as predetermined by a time cycle controller (not shown), valve 26 in line 3 which had been open will be closed and valve 21 will be opened, allowing the regeneration gas to flow into header 22 through line 38 and valve 39 into vessel 11. Line 38 enters vessel 11 similar to the entrance of inlet 57 into sorber 40. To reach the bed of adsorbent material within inner shell 47, the cooling gas stream flowing into sorber 40 flows downwardly in annular space 59 between cylindrical shell 41 and intermediate shell 44 around the lower edge of shell 44 and upwardly in annular space 60 between shell 44 and inner shell 47. The cooling gas then flows over the upper edge of shell 47 through cylindrical screen 58 and downwardly through the bed of adsorbent material. Gas is discharged through outlet 61 of sorber 40. Similarly, referring to FIG. 1, this cooling gas stream would be discharged from vessel 11 through line 15, valve 32, line 31, cooler 30, separator 33 and line 35 into header 7.

By providing sorber 40 with two inner shells 44 and 47 substantial savings in the amount of heating and cooling gas streams needed for regeneration are accomplished. During the heating portion of the regeneration cycle the outer shell is insulated from the hot regeneration gas stream so that the outer vessel shell is not heated unnecessarily. When the heating of the adsorbent bed has been completed, the cooling stream is caused to flow through the annular passages as described whereby the shells are cooled by this cooling stream before the adsorbent bed is cooled. This initial shell cooling has been found to be very advantageous over the methods and structures of the known prior art. Previous methods and structures required prolonged cooling of the adsorbent bed because the vessel shell continued to warm the adsorbent bed during cooling. The flow path provided for the cooling gas by the present invention cools the shell containing the adsorbent bed before cooling the adsorbent bed. While this flow path causes the cooling gas flowing into the adsorbent bed to be partially warmed when the system is originally switched to the cooling portion of the regeneration cycle, this slight warming does not appreciably affect the ability of the cooling gas stream to cool the adsorbent bed since the temperature of the bed would be substantially above the temperature of the cooling gas stream entering the adsorbent bed. When the bed has been partially cooled, the shell will have been cooled so that the temperature of the cooling gas entering the adsorbent bed will still be less than the adsorbent bed temperature.

Extensive tests have been conducted comparing the insulating and heat saving advantages of the present invention over previous methods and apparatus. Comparison of tests run on towers constructed in accordance with the present invention with towers of the older design disclose the following about the present invention: (1) regeneration temperature reached faster; (2) reduced heat loss to atmosphere through radiation from its upper head; (3) regeneration gas outlet temperature decreased as soon as cooling of the tower commenced; and (4) the heat front is not moved through the bed of the tower by the cooling gas. These tests thoroughly substantiate the claims of heat savings for the present invention.

Therefore, we have provided a new and novel system for adsorbing certain components from a natural gas stream.

What we claim and desire to secure by Letters Patent is:

1. In an adsorption system, an adsorption vessel comprising, an outer shell, an inner shell within and spaced from said outer shell, an intermediate shell positioned between and spaced from said outer shell and said inner shell, a first vessel inlet extending from the exterior of said outer shell into the interior of said inner shell, a vessel outlet connecting from the interior of said inner shell to the exterior of said outer shell, a second vessel inlet connecting into the space between said outer shell and said intermediate shell, said space between said outer shell and said intermediate shell being connected through the space between said inner shell and said intermediate shell into the interior of said inner shell providing a gas flow passageway across a substantial portion of the inner surface of said outer shell and across a substantial portion of the outer surface of said inner shell before connecting into the interior of said inner shell.

2. An adsorption vessel comprising, an upright cylindrical vessel having an outer cylindrical shell, an upper head and a lower head closing the upper and lower ends of said outer cylindrical shell, an inner cylindrical shell positioned upright within and spaced from said outer shell, a third cylindrical shell positioned upright between and spaced from said inner and said outer shells, a head closing the upper end of said third shell, means closing the space between said inner and said outer shells, said closing means being spaced below the lower end of said third shell, a first inlet extending through said upper head and said head closing the upper end of said third shell, a second inlet extending through said upper head and an outlet extending through said lower head.

3. An adsorption vessel comprising, a cylindrical shell, an inlet head, an outlet head, said inlet head and said outlet head each secured to said shell to form a closed vessel, an inner cylindrical shell positioned within and spaced from said cylindrical shell, a third cylindrical shell positioned between and spaced from said inner shell and said cylindrical shell, a head closing the end of said third shell nearest said inlet head, means closing the space between the end of said inner shell nearest said outlet head and said cylindrical shell, means providing a flow passage adjacent to said closing means from the space between said third shell and said cylindrical shell to the space between said third shell and said inner shell, a main stream inlet extending into the interior of said third shell head, an outlet extending from the interior of said outlet head and a second inlet extending into the interior of said inlet head.

4. The process of adsorbing components from a natural gas stream comprising, initially flowing the natural gas stream through an adsorbent bed to adsorb components from said natural gas stream and bypassing the area surrounding said adsorbent bed, flowing hot natural gas through said adsorbent bed to regenerate said adsorbent bed and bypassing the area surrounding said adsorbent bed, flowing a cooling stream first in surrounding relation to said bed and then through said adsorbent bed and subsequently flowing said natural gas stream into said adsorbent bed to adsorb components from said natural gas stream.

5. The process of adsorbing components from a natural gas stream comprising, initially flowing the natural gas stream through an adsorbent bed to adsorb components from said natural gas stream while preventing the flow of said natural gas stream through the area surrounding said adsorbent bed, flowing hot natural gas through said adsorbent bed to regenerate said adsorbent bed while preventing the flow of said hot natural gas through the area surrounding said adsorbent bed, flowing a cooling stream first in surrounding relation to said bed and then through said adsorbent bed, and subsequently flowing said natural gas stream into said adsorbent bed to adsorb components from said natural gas stream.

6. An adsorption vessel comprising, a first cylindrical shell, an inlet head, an outlet head, said inlet head and said outlet head each secured to said shell to form a closed vessel, an inner cylindrical shell positioned within and spaced from said first cylindrical shell, a third cylindrical shell positioned between and spaced from said inner shell and said first cylindrical shell, a head closing the end of said third cylindrical shell nearest said inlet head, means near the end of said inner shell nearest said outlet head defining a flow passage from said space between said third shell and said first shell to the space between said third shell and said inner shell, a main stream inlet extending into the interior of said third shell head, an outlet extending from the interior of said outlet head, and a second inlet extending into the interior of said inlet head.

References Cited in the file of this patent

UNITED STATES PATENTS

| | | |
|---|---|---|
| 1,759,812 | Gray | May 20, 1930 |
| 2,790,505 | Dow | Apr. 30, 1957 |
| 2,823,764 | Miller | Feb. 18, 1958 |
| 2,957,544 | Baker | Oct. 25, 1960 |